Patented Oct. 2, 1923.

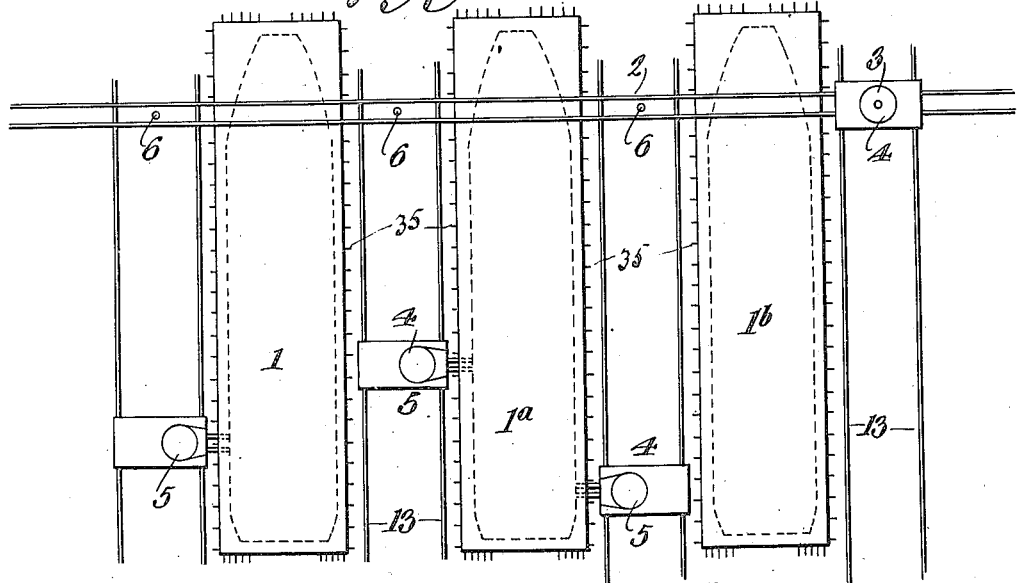
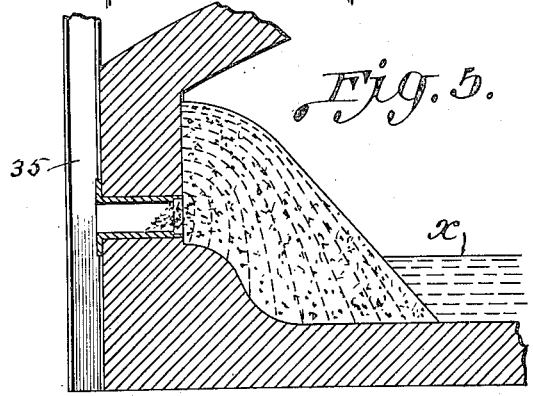
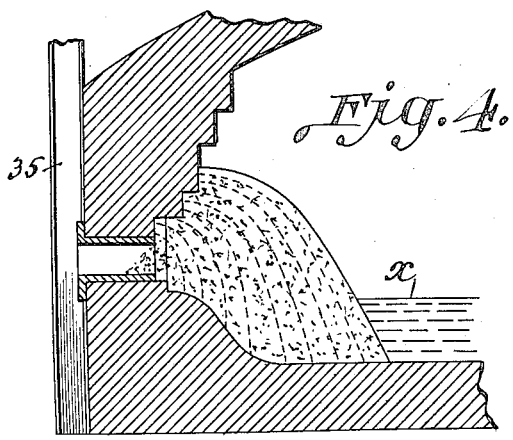

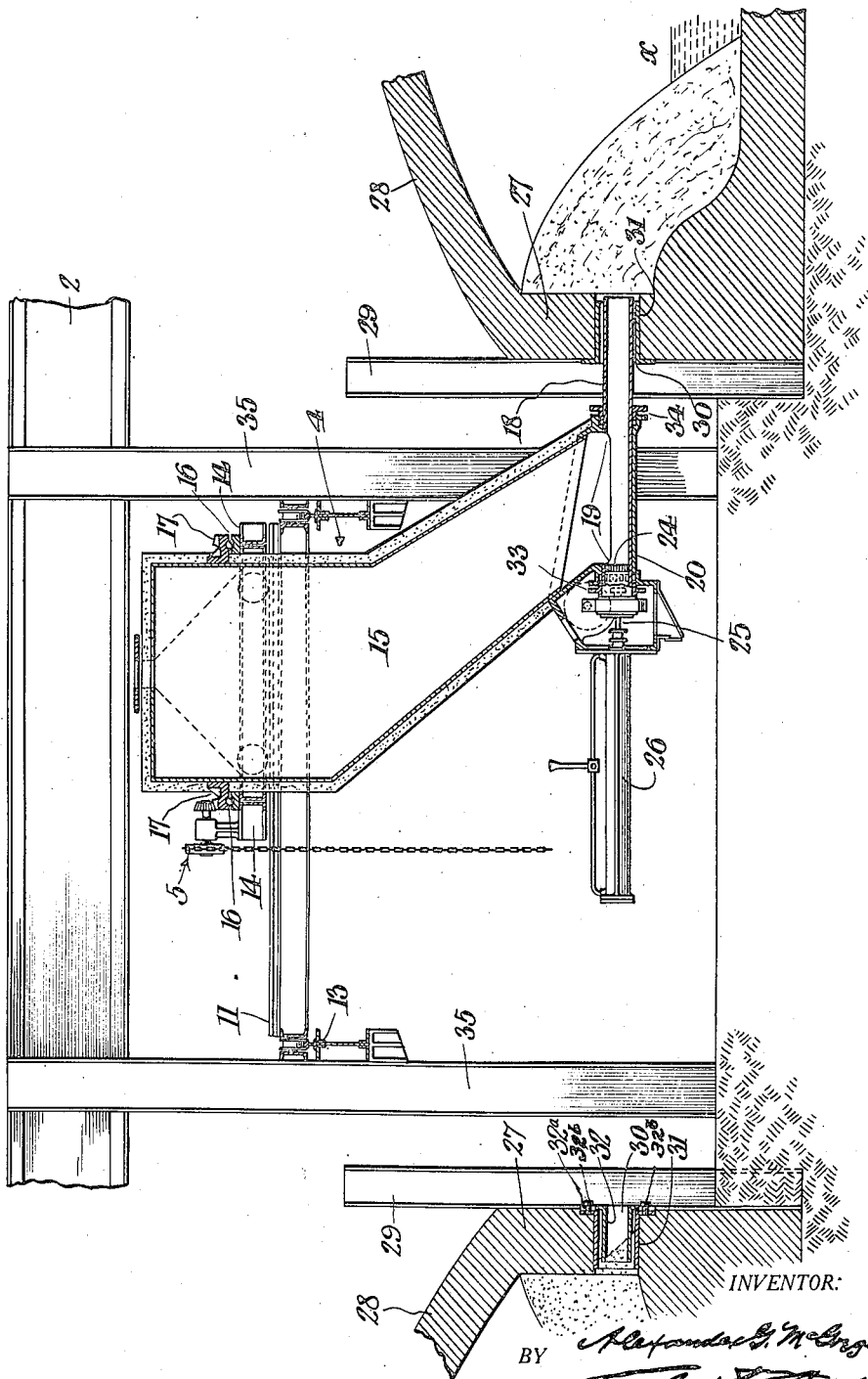

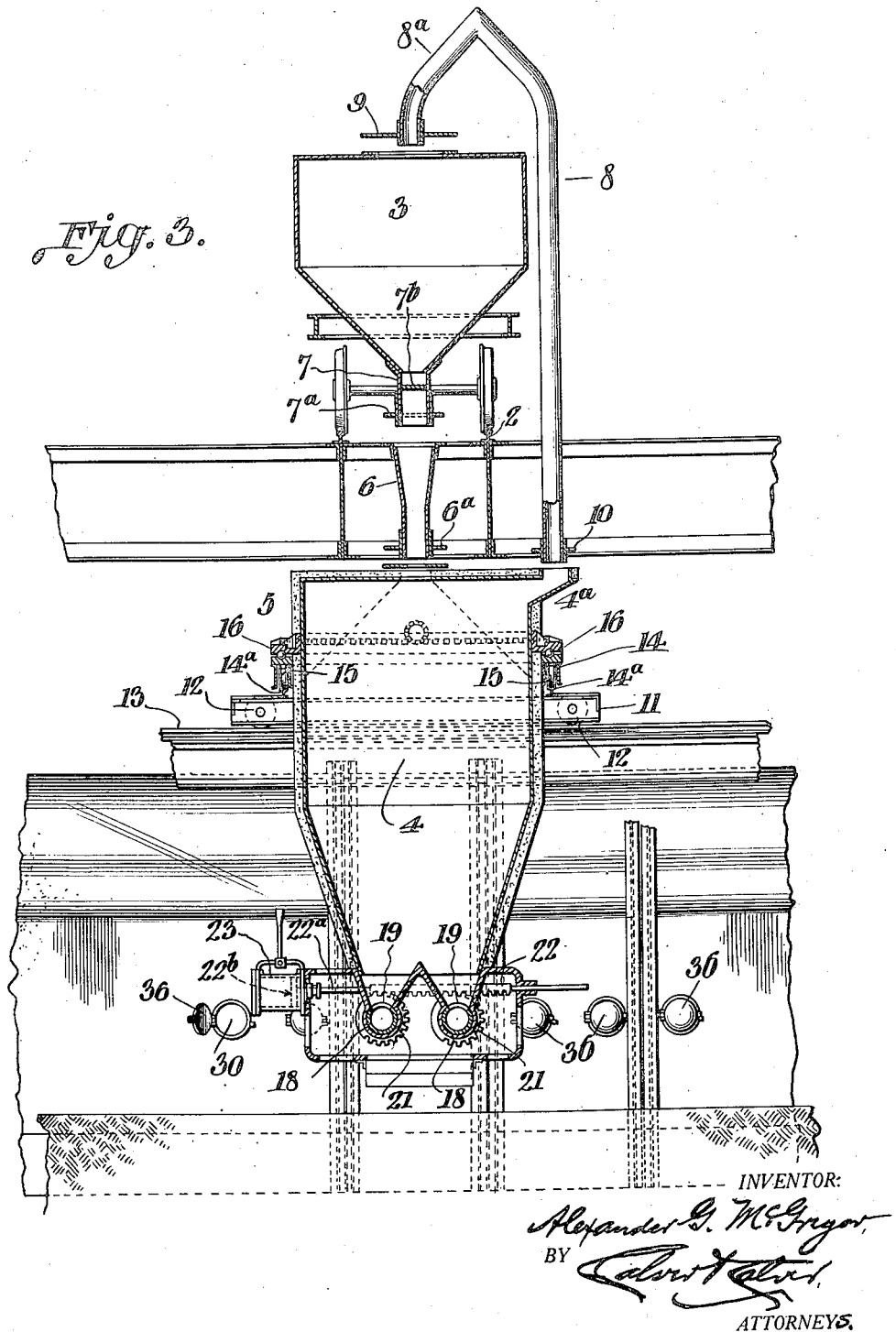

1,469,327

UNITED STATES PATENT OFFICE.

ALEXANDER GRANT McGREGOR, OF WARREN, ARIZONA.

APPARATUS FOR CHARGING REVERBERATORY FURNACES.

Application filed October 30, 1920. Serial No. 420,645.

*To all whom it may concern:*

Be it known that I, ALEXANDER G. MC-GREGOR, a citizen of the United States, residing at Warren, in the county of Cochise and State of Arizona, have invented or discovered certain new and useful Improvements in Apparatus for Charging Reverberatory Furnaces, of which the following is a specification, reference being had therein to the accompanying drawings.

This invention relates to means for charging calcine and flue dust into reverberatory furnaces which have been commonly used in the practice of copper smelting for a number of years.

I propose to feed the charge through the side walls of the furnace also, but instead of feeding it in near the top of the side walls of the furnace, as heretofore, and thus covering the molten and partly fused surface of a previous charge with a layer of comparatively cold new charge, I provide positive means for forcing the new charge into the furnace through the side walls of the furnace underneath and back of the previous charge. In my system the new charge is deposited just inside the furnace walls and just above the slag line and the previous charge is pushed or advanced farther into the furnace. The previous charge pushes the charge which was charged before it, and so on with the result that a charge advances from the side walls of the furnace step by step, growing hotter as it advances, until it finally becomes exposed to the intense heat of the furnace and is smelted down and dissolved in the molten bath of the furnace.

In thus feeding in the calcine the side walls of the furnaces are protected and kept cool by the new charge, while the surfaces of the unfused charge exposed to the heat and gases on the inside of the furnace are always in a semi-molten condition. This condition results in uniform temperature inside the furnace and in the molten bath; also the particles of the charge are all practically smelted before they drop down into the molten bath tending to make more efficient smelting and cleaner slags. Also this semi-molten crust or surface, covering the unfused charge, makes a seal which does not allow the dust of the charge to pass up through it and get into the furnace where it would cause injury to the exposed brick walls inside the furnace or be carried away by the gases and lost.

Mechanical constructions carrying out my invention are illustrated in the accompanying drawings in which Fig. 1 is a diagrammatic plan showing a group of reverberatory furnaces with an approved arrangement of co-operating tracks, etc., Fig. 2 is a sectional elevation showing a charge hopper and charging machine and two reverberatory furnaces in fragmentary cross section. Fig. 3 is a sectional view of the calcine car, the charging machine and co-operating parts and a partial side elevation of a reverberatory furnace. Figs. 4 and 5 are partial cross sections, to be hereinafter referred to, of reverberatory furnaces.

Referring to the drawings, 1, 1$^a$, 1$^b$ represent reverberatory furnaces over which is supported charge tracks 2 and on which a calcine car 3 may run, said tracks being suitably supported by girders or by any other suitable means. Running transversely to the charge track 2, and parallel to the side of the furnace, are tracks 13 supporting a crane bridge 11 having wheels 12 running on said tracks 13, the said bridge 11 supporting a charge hopper 4. Beneath the tracks 2 is arranged the charging machine 5. Between the tracks 2 are chutes 6 beneath which the charge hoppers 4 may be located when the said hoppers are to be charged from the calcine car 3. In order to provide dust tight connections between the calcine car and the charging hopper a flanged sleeve 7$^a$ is mounted on the discharge spout 7 of the calcine car, so that when said sleeve is lowered into contact with the support for the chute 6 the flange of said sleeve will prevent the dust from escaping at this point, and the chute 6 is provided at its lower end with a similar flanged sleeve 6$^a$ which may be lowered into contact with the top of the charge hopper 4 to make a tight joint at this point.

When the hopper is to be charged or filled from the calcine car the escaping air displaced by the charge will carry more or less valuable dust, and to prevent waste of such dust the hopper 4 is provided with an opening 4$^a$ communicating with the chamber of the hopper and which opening may be brought into register with a dust vent pipe 8 which has at its top a downwardly turned part 8$^a$ which is adapted to deliver the dust with the escaping air, into the calcine car 3, so that no valuable dust will be lost. A flanged sleeve 10, mounted at the lower end of the dust pipe 8 may be lowered into contact with the top of the charge hopper 4 above the opening 4ᵃ so as to make a dust tight joint at this point, and a dust tight joint between the downwardly turned part 8ᵃ of the dust pipe and the calcine car 3 may be provided by a flanged sleeve 9 mounted at the lower end of the said downwardly turned part, and the flange of which sleeve, when the said flange is lowered into contact with the calcine car 3, will make a dust tight joint at this point.

The charging machine 5 comprises a trolley 14 having wheels 15 running on suitable tracks 14ᵃ supported by the crane bridge 11, said tracks being arranged transversely of the track or runway 13 so that the charge hopper may be moved from and toward a reverberatory furnace which is to be charged. The charging machine 5 also comprises a turntable 16 the lower part of which is supported on the trolley 14 so that the charging machine may be rotated through an angle of 180° so as to charge opposing sides of two furnaces arranged as shown in Fig. 1.

At the bottom of the charge hopper is a housing 20 in which are rotatably mounted tubes 18 having slots or openings 19 which may be brought into register with openings in the bottom of the charge hopper. The tubes 18 are provided with segment gears 21 which mesh with a rack 22 carried by a piston rod 22ᵃ connected with a piston 22ᵇ in a hydraulic cylinder 23 having suitable connections so that the piston may be moved back and forth in said cylinder to partially rotate the tubes 18 when desired. When the said tubes are in the position shown in Fig. 3 they may be filled from the hopper 4 and when thus filled they may be partially rotated to close the openings 19.

Fitting in the tubes 18 are plungers 24 which are connected by rods 25 with pistons in hydraulic cylinders 26 so that the said pistons may be operated to cause the plungers 24 to move forward and thus positively discharge the calcine in the tubes 18 into the furnace.

The side walls 27 of the reverberatory furnaces are provided with openings 30 with which the tubes 18 may be brought into register. These openings 30 may be lined with sleeves 31 set in the walls of the furnace and within which may be smaller sleeves 32 loosely fitting the tubes 18. The flanges of the sleeves 32 are preferably provided with openings or slots 32ᵃ through which bolts 32ᵇ loosely pass, so that the said sleeves 32 may be adjusted to different positions to bring them into register with the charging tubes 18, notwithstanding any changes in position of the sleeves 31 due to expansion or contraction of the walls of the furnace resulting from heat or cold. The openings 30 may, if desired, be closed by suitable doors 36, as shown at the lower part of Fig. 3.

It will be noted that the openings 30 are at the lower parts of the side walls 27 of the furnace, said openings being but slightly above the level of the slag line $x$ of the molten charge. Owing to the arrangement of these openings in the lower part of the furnace walls it results that the calcine which is forced through said openings will be deposited just inside the furnace walls and just above the slag line, and the previous charge is pushed or advanced farther into the furnace. The previous charge pushes the charge which was before it and so on with the result that as a charge advances from the side walls of the furnace step by step it is growing hotter as it advances until it finally becomes exposed to the intense heat of the furnace, and is melted down and dissolved in the molten bath of the furnace, as hereinbefore set forth. Also in thus forcing in the charge at a comparatively low point in the furnace the charge piles up against the side walls of the furnace, as indicated in Figs. 2 and 5 of the drawings, thus protecting these walls which are kept cool by the new charge, and it will therefore not be necessary to "fettle" the side walls of the furnace as heretofore; whereas if the charge had been forced through the furnace wall at a higher level or near the top of the furnace, the new charge, instead of the old charge, will be subjected to the greatest heat as hereinbefore explained, which is very disadvantageous.

In the operation of the invention the car 3, containing the charge, is so located on the track 2 that its discharge spout 7 will register with a chute 6. Sleeves 7ᵃ and 6ᵃ and 9 and 10 are then dropped so as to make tight connections between the respective parts which they serve. The gate 7ᵇ in the bottom of the car 7 is opened and the charge in the car is dropped into the charge hopper 4 of the charging machine. The charge hopper is then disconnected from the chute 6 and vent pipe 8 by lifting the flanged sleeves 6ᵃ and 10 and is then free to be moved by the crane bridge 11 supporting it to any position along the furnace. By means of the bridge movement the tubes 18 may be brought into register with any of the holes 30 in the side walls of the furnace. By moving the trolley 14 to the right (Fig. 2) the tubes 18 will be caused to enter the holes 30 and when they are moved into the holes sufficiently the trolley is stopped. The slots 19 in tubes 18 being in their upward position the tubes 18 are filled with calcine from the charge hopper 4.

By admitting fluid under pressure into the cylinder 23 on the right hand side of the piston (Fig. 3) in it the tubes 18 are rotated 180° so that the slots 19 in them are in a downward position. The turning of the tubes thus serves as a shutting off gate and no more material can run from the hopper into the said tubes when the said slots are in a downward position. After the slots are turned downward fluid under pressure is admitted to the left side of the piston (Fig. 2) in the cylinder 26 which forces the piston rod 25 outward and the plungers 24 to the right. The latter force the charges in the tubes 18 out through the end of the tubes and into the furnace underneath the charges that have previously been forced into the furnace. By releasing the fluid on the left hand side of the piston in the cylinder 26, and admitting fluid to the right hand side, the plungers 24 are returned to their original positions as shown in Fig. 2. By releasing the fluid on the right hand side of the piston in cylinder 23, and admitting pressure on the left hand side, the tubes 18 are rotated back to the position shown in Fig. 3 and the material from the charge hopper 4 drops into them filling them for another charge which can be forced into the furnace as before. If desired, the trolley carrying the charge hopper can be moved to the left of the position shown so that the right hand ends of the tubes 18 will clear the buck stays 29 or the supporting columns 35, as required, and the travelling bridge 11 supporting the trolley 14 may be moved forward or backward on the runway 13 so that the tubes 18 may be brought to register with the next two holes in the side of the furnace to be charged. The trolley is then moved to the right and the tubes 18 are projected into the holes to be charged and these holes are charged as before. When the side of one furnace is completely charged the charge hopper 4 and its charging tubes with their cylinder may be turned on the turntable 16 through an angle of 180° so that the charge tubes will enter the charge holes in the furnace on the other side. One charging machine can thus be used to charge the sides adjacent to it of either furnace between which it is located. It will be seen that to charge both sides of any number of furnaces installed adjacent to each other in one plane one more machine than the number of furnaces will be required. It will be understood that the power for rotating the tubes 18 and for forcing the plungers 24 through the tubes may be obtained through means other than the hydraulic cylinders 26 and 23.

When the tubes 18 are withdrawn from charge holes in the furnace the charge just pushed in at the inner end of the charge hole will fall back somewhat toward the outer end of said charge hole, thus sealing it so that no air will be drawn through it into the furnace. If desired, however, doors 36 may be hinged to the outer ends of the tubes 32 so that they may be opened for the entrance of charge tubes 18 and closed after the charge tubes are withdrawn. It will be understood that the crane bridge, trolley and turntable may be operated by hand power or by electric or other motors. Also it will be understood that the charge holes in the furnace and the charging tubes of the movable charging machine may be somewhat higher or lower than the position shown. Also it will be understood that the charging tube or tubes with the plungers for forcing the charge into the furnace might be used in connection with stationary charge hoppers as well as with the movable charge hoppers herein described.

In the operation of my invention (see Fig. 5) the oldest charged material is trickling down the slope. Fig. 4 shows a method of arranging the brick work inside the furnace to facilitate the step by step advance of the charge inside the furnace walls.

It will thus be understood that the invention comprises means for positively forcing charges into the side walls of a reverberatory furnace down near the slag line so that the charge will be forced underneath and back of the previous charge, such previous charge being advanced toward the center of the furnace as hereinbefore indicated.

Instead of positively forcing the charge through the low down side walls of the furnace by the tubes and pistons hereinbefore described other means, such, for example, as a worm feeder may be employed for this purpose, although the tubes and pistons hereinbefore described are deemed to be preferable. The invention as herein illustrated shows two tubes at the lower part of the charge hopper, but it will be understood that any desired number of these tubes, operating as hereinbefore described, might be employed, or only a single tube might be used if desired. The invention is therefore not to be understood as being limited to the details herein set forth, as such details may be varied widely, within the limits of mechanical skill, without departing from the spirit of the invention.

Having thus described my invention I claim and desire to secure by Letters Patent:

1. A charging machine for reverberatory furnaces comprising a charge hopper having a housing at its bottom, one or more rotatable tubes mounted in said housing and each having an opening which may be brought into register with an opening or openings at the bottom of said hopper, means for partially rotating said tube or tubes when filled with the charge, plungers working in said tubes for positively forcing the charge into a furnace and means for operating said plungers.

2. A charging machine for reverberatory furnaces comprising a charge hopper having a housing at its bottom, one or more rotatable tubes mounted in said housing and each having an opening which may be brought into register with an opening or openings at the bottom of said hopper, means for partially rotating said tube or tubes when filled with the charge, plungers working in said tubes for positively forcing the charge into a furnace and means for operating said plungers, said means for partially rotating said tubes comprising segment gears on the tubes, a rack meshing with said gears, and means for operating said rack.

3. An apparatus for charging reverberatory furnaces comprising a track or runway above the furnace or furnaces, a calcine car adapted to move on said track or runway, a chute with which the discharge spout of said calcine car may be brought into register, a charge hopper having an opening adapted to be brought into register with said chute, and flanged sleeves for making tight joints between said discharge spout and said chute and between said chute and said charge hopper.

4. An apparatus for charging reverberatory furnaces comprising a track or runway above the furnace or furnaces, a calcine car adapted to move on said track or runway, a chute with which the discharge spout of said calcine car may be brought into register, a charge hopper having an opening adapted to be brought into register with said chute, flanged sleeves for making tight joints between said discharge spout and said chute and between said chute and said charge hopper, said charge hopper having a vent opening in its top, a vent dust pipe with which said vent opening may be brought into register, the latter extending upward from said charge hopper and communicating with the top of said calcine car, flanged sleeves for making tight joints between the said vent dust pipe and said car and also between the lower end of said dust pipe and the said charge hopper.

5. The combination with a reverberatory furnace having charging holes in its side walls, of a charging machine provided with a hopper, a turn-table on which said machine is mounted, a trolley on which said turn-table is mounted so that said machine may be moved towards and from said furnace, a travelling bridge on which said trolley is mounted so that said machine may be moved by said bridge lengthwise of the furnace, an elevated track, a calcine car to run on said track and connections between said car and said hopper whereby the latter may be filled from the former.

In testimony whereof I affix my signature.

ALEXANDER GRANT McGREGOR.